United States Patent
Cheng et al.

(10) Patent No.: US 7,627,502 B2
(45) Date of Patent: Dec. 1, 2009

(54) SYSTEM, METHOD, AND MEDIUM FOR DETERMINING ITEMS TO INSERT INTO A WISHLIST BY ANALYZING IMAGES PROVIDED BY A USER

(75) Inventors: Lili Cheng, Bellevue, WA (US); Kamal Jain, Bellevue, WA (US); Michael Connolly, Seattle, WA (US); Alexander G. Gounares, Kirkland, WA (US); Gary W. Flake, Bellevue, WA (US); Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 15 days.

(21) Appl. No.: 11/868,752

(22) Filed: Oct. 8, 2007

(65) Prior Publication Data

US 2009/0094260 A1 Apr. 9, 2009

(51) Int. Cl.
*G06F 17/30* (2006.01)
(52) U.S. Cl. .......................... 705/26; 705/27
(58) Field of Classification Search ............... 705/26, 705/27
See application file for complete search history.

(56) References Cited

U.S. PATENT DOCUMENTS

| | | | |
|---|---|---|---|
| 6,901,378 B1 | 5/2005 | Linker et al. | |
| 7,188,081 B1 | 3/2007 | Shah | |
| 7,219,073 B1 | 5/2007 | Taylor et al. | |
| 7,228,283 B1 | 6/2007 | Hornstein | |
| 2005/0177458 A1* | 8/2005 | Martineau et al. | 705/26 |
| 2005/0256786 A1 | 11/2005 | Sands et al. | |
| 2006/0240862 A1* | 10/2006 | Neven et al. | 455/550.1 |
| 2007/0005571 A1 | 1/2007 | Brewer et al. | |

FOREIGN PATENT DOCUMENTS

WO 0239216 A2 5/2002

OTHER PUBLICATIONS

SnapTell, Feb. 17, 2007 http://web.archive.org/web/20070217051513/http://snaptell.com/howToShop.html.*

(Continued)

*Primary Examiner*—Jeffrey A Smith
*Assistant Examiner*—Matthew Zimmerman
(74) *Attorney, Agent, or Firm*—Shook, Hardy & Bacon L.L.P.

(57) ABSTRACT

Wish list creation and population is provided where users can associate one or more images as items in a wish list. To this end, an image can be provided, such as a photograph taken by the user, and analyzed to locate matching items and information related thereto. In this regard, the user can observe and desire to purchase an item without knowledge of specifics about the item. The user can then take a picture of the item and tag the picture for upload to their wish list. Matching can be provided to identify one or more items in the picture to facilitate retrieval of information related to the items. Also, items can be selected based on discerned characteristics of the picture in a design/fashion consultant context.

15 Claims, 10 Drawing Sheets

OTHER PUBLICATIONS

Cascia, et al., Combining Textual and Visual Cues for Content-based Image Retrieval on the World Wide Web, http://www.cs.bu.edu/techreports/pdf/1998-004-combining-text-and-vis-cues.pdf, Jun. 1998, 5 pages.

Long, et al., WebMIRS: Web-based medical information retrieval system, http://cat.inist.fr/?aModele=afficheN&cpsidt=2042045, Jul. 6, 2007, 2 pages.

Gudivada, et al., Information Retrieval on the World Wide Web, http://ieeexplore.ieee.org/iel1/4236/13574/00623969.pdf?isNumber=, Sep. 1997, 11 pages.

Kobayashi, et al., Information Retrieval on the Web, http://delivery.acm.org/10.1145/360000/358934/p144-kobayashi.pdf?key1=358934&key2=5708263811&coll=GUIDE&dI=GUIDE&CFID=27542727&CFTOKEN=18836860 Jun. 2, 2000, 30 pages.

* cited by examiner

SYSTEM, METHOD, AND MEDIUM FOR DETERMINING ITEMS TO INSERT INTO A WISHLIST BY ANALYZING IMAGES PROVIDED BY A USER

BACKGROUND

Cameras have evolved in the years past from large complicated devices requiring multiple step developing of pictures, often by a professional, to portable devices that offer film for developing of pictures in corner stores, and most recently to portable, and often micro-sized, devices allowing digital pictures to taken and stored on the camera, computers, and other digital media. Moreover, many cellular phones come equipped with cameras allowing pictures to be snapped, stored on the cellular phone, and uploaded to a remote server (and/or sent to other phones and devices). In this regard, people often have easy access to some sort of image capturing device and a way to get the pictures from the camera to another digital device for versatile viewing and/or sharing thereof.

The evolution of computers and networking technologies from high-cost, low performance data processing systems to low cost, high-performance communication, problem solving, and entertainment systems has provided a cost-effective and time saving means to lessen the burden of performing every day tasks such as correspondence, bill paying, shopping, budgeting information and gathering, etc. For example, a computing system interfaced to the Internet, by way of wire or wireless technology, can provide a user with a channel for nearly instantaneous access to a wealth of information from a repository of web sites and servers located around the world. Such a system, as well, allows a user to not only gather information, but also to provide information to disparate sources.

Shopping is one area of popularity; stores can offer websites that allow users to purchase items in the store and to create wish lists of items for later purchase. One problem with wish lists is that a user is not always aware of items they desire while sitting at the computer shopping at the online retail website. Rather, many users desires are triggered by sight and what they see on a day-to-day basis; additionally, items online can look different, appear different, or inspire different senses than what a person sees in a real-world context. In this context, however, items are not always easily identified as brand and product names are typically not a visible part of the item(s). To this end, wish lists are not always an effective mechanism for truly capturing items that a user may desire as the items may not catch the user's attention in the online digital context.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Wish list creation and population is provided where one or more items in a wish list can be an image transmitted by an entity, such as a user, to which the wish list relates. Additionally, the one or more items can be populated to the wish list based on a transmitted image that displays the items, such as an image provided as a photograph taken from a digital camera, cellular phone equipped camera, and/or substantially any digital format. For example, an image comprising one or more items desired by the user can be uploaded and populated to a wish list. Upon subsequently accessing the wish list, the user can provide additional information regarding one or more items in the image. Additionally or alternatively, items in the image can be automatically matched to one or more retail items. Upon item identification, whether manually or automatically, additional information can be associated with the one or more items including retail locations, pricing, and the like. Moreover, similar items can be used to populate the wish list upon identifying the item, such as items in the same or a similar retail category, items that are accessories to the identified items, items bought by others who have the identified item in their wish list, and/or the like, for example.

In one embodiment, a photograph can be taken of a desired outfit, gadget, toy, and/or other retail item seen in a real-world context. The photograph medium can allow the image to be tagged for upload to a wish list, for example. Once uploaded, the image can be evaluated for one or more items and matching can be performed to find available retail images related to the one or more items. Information related to the retail images found can be associated with the items in the wish list image and/or as selectable options as to which item in the image the user desires. Once one or more retail items are identified as part of the image, additional retail items similar or related to the identified items can be located and populated to the wish list as well. Additionally, an image can be provided for which design/fashion advice is desired. For example, the image can be of a person and/or inanimate object, and professionals (or an inference functionality) can provide suggested items for population to the wish list based on the image.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Wish list creation and population is provided based on one or more images where items in a wish list can be added and managed based in part on associated or received images. The images can be digitally captured (e.g. digitally photographed, scanned, downloaded, created by image editing software, screen-shot, etc.) or otherwise provided and subsequently digitized, such as film photographed, sketched, painted, clipped from a publication, and the like. For example, the images can be tagged for subsequent population to a wish list. Additional information related to the images can be located and populated to the wish list as well. Additionally, the images can be subject to automatic analysis of the image and characteristics associated therewith to determine information about the image; the information can relate to colors used in the image (skin-tones, shadings, hues, color combinations of items, lighting, contrast, saturation, tint, etc.), number and/or size of items in the image, settings/backgrounds of an item in the image, and/or other determinable features of the image for example. Using such characteristics, a wish list can be modified as well, for instance, to include one or more items that relate to the determined characteristics. Moreover, the images can define one or more items, and the item in the image can be identified as described herein. Items can be inserted into a wish list based in part on the discovered identifications.

In one embodiment, the images can be photographs taken by a person or other entity. The photographs can be flagged for population to one or more associated wish lists, for example. Using the photograph, the subject matter as described can populate the user or entity wish list based in part on characteristics of the photograph. For example, the photograph can comprise merchandise the entity wishes to purchase for itself or another. The photograph, and/or a portion thereof, can be tagged to be part of a wish list. The item(s) in the photograph can be identified and matched to products, and/or similar products can be recommended based on the identification. Additionally, characteristics, such as colors or hues/shades of colors, can be identified, and products can be placed in a wish list that matches the colors or other characteristics of the photograph, for example.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
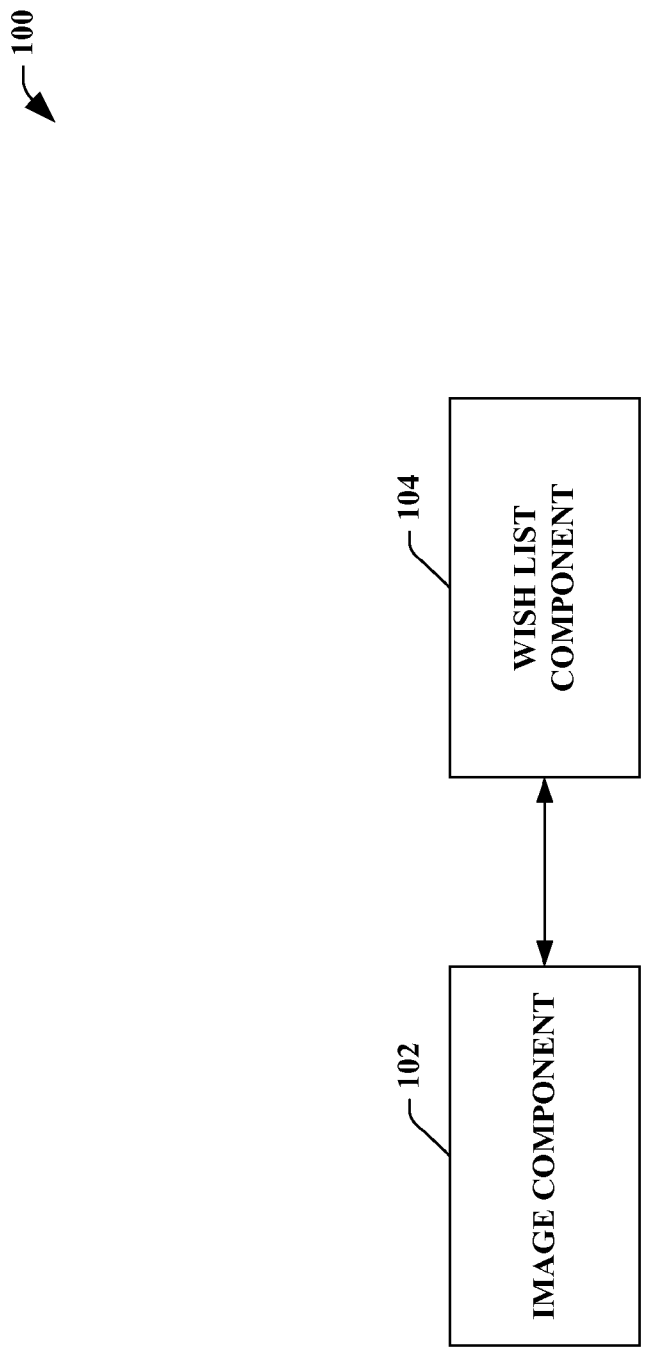
FIG. 1 illustrates a block diagram of an exemplary system that associates an image with a wish list.

Now turning to the figures, FIG. 1 illustrates a system 100 that facilitates associating an image with a wish list. An image component 102 is provided that can create and/or take an image as input as well as a wish list component 104 that can manage one or more wish lists. In one embodiment, the image component 102 can provide an image to the wish list component 104, such as a captured image or a portion thereof. The wish list component 102 can tag the image and/or associate the image with one or more items to be stored in a wish list related to a user/entity of the wish list component, for example.

In one embodiment, the image component 102 can receive an image comprising an item or information/characteristics to be used in populating a wish list; the wish list can be related to the entity from which the image originates, for example. Thus, the image can come from a user along with a request to be input into a wish list related to the user. For example, the image can originate from a device utilized by the user, such as a digital camera (e.g. cellular phone equipped camera, video recorder, etc.) and/or a scanner used to digitize substantially any image (from an analog camera, magazine, etc., for example). Such images, or substantially any digital image (e.g. images from a website or other digitally store images), can be sent to the image component 102. In one embodiment, the image component 102 can forward the image directly to the wish list component 104 for storage in a wish list related to one or more users (such as the user that sent the image to the image component 102, for example). Subsequently, a user or other entity can access the wish list component 104 to input additional information regarding the image, and/or the image can be identified via a matching or other verification feature. The additional information can include identification of one or more items in the image, which can lead to identification of other information related to the item(s) such as product specifications categories, age groups, available options and accessories, competing products, retail locations, pricing, reviews, or substantially any retail product related information. Additionally, the information can include other characteristics of the item itself such as colors, angles, sizes, and other metrics. This information can subsequently be used to locate the item and/or similar items for recommendation thereof.

For example, a user having a digital or cellular phone equipped camera can see an item of interest for the user or another being; however, the user may not know what exactly the item is (e.g. a new toy or gadget), where to find it, or how much it costs. The user can photograph the item and send the photograph to the image component 102 (whether by way of the cellular phone, wireless internet access on the digital camera, a computer that receives the image at a later time, and/or substantially any communicative coupling of a camera to a storage device or location) tagging it for addition to the wish list. In one embodiment, the image component 102 can send the image, or a link thereto, to the wish list component 104, and the user can subsequently access the wish list component 104 to view the image. At this point, the user can try to locate additional information regarding the image and associate the information, such as identification of the product, so that the item is easily accessed when desired from the wish list. Furthermore, other items can be located having similar characteristics, for example. In another embodiment, once the photograph is sent to the image component 102 it can be automatically matched to one or more items such that the user need not locate the information. Additionally or alternatively, the user can be presented with options as to possible matching items; once an appropriate item is selected, similar to the embodiment above, additional information can be located regarding the selected item (such as identification information, one or more retail categories, options for sizes, quantities, colors, and the like, available retailers, etc.). Furthermore, using this information, the wish list can be populated with or recommend related items, such as those in the same categories and/or accessories related to the selected item, for example.

In another example, a user can take pictures of him or herself and/or another being or inanimate object, such as a room, piece of furniture, clothing, automobile, and other objects for which design consulting can be desired, and send it to the image component 102. The image component 102, or a user thereof, such as a professional designer/shopper, can discern characteristics of the entity in the image for locating one or more items to place in the user's wish list. For example, where the photograph is of a person, the image component 102, or a shopper, can evaluate the user's skin tone, body shape, clothing style in the image, hair style, facial features, body type, and the like to choose one or more items of clothing, make-up, hairstyle, and/or substantially any accessory or style item for input into the wish list component 104 based in part on the evaluation. Where the picture is of a room, for example, the image component 102, or a design consultant utilizing the image component 102 for example, can evaluate characteristics of the image such as colors, shades, hues, furniture, layout, and the like to choose one or more items, such as wallpaper, paint, additional furniture, curtains, and/or substantially any furniture/accessory for the room, to be input into the wish list component 104. Subsequently, the user can access the wish list component 104 and see the recommended items. Additionally, the wish list component 104 can locate other items for the wish list based on information regarding the recommended items present in the wish list, for example.

Figure 2:
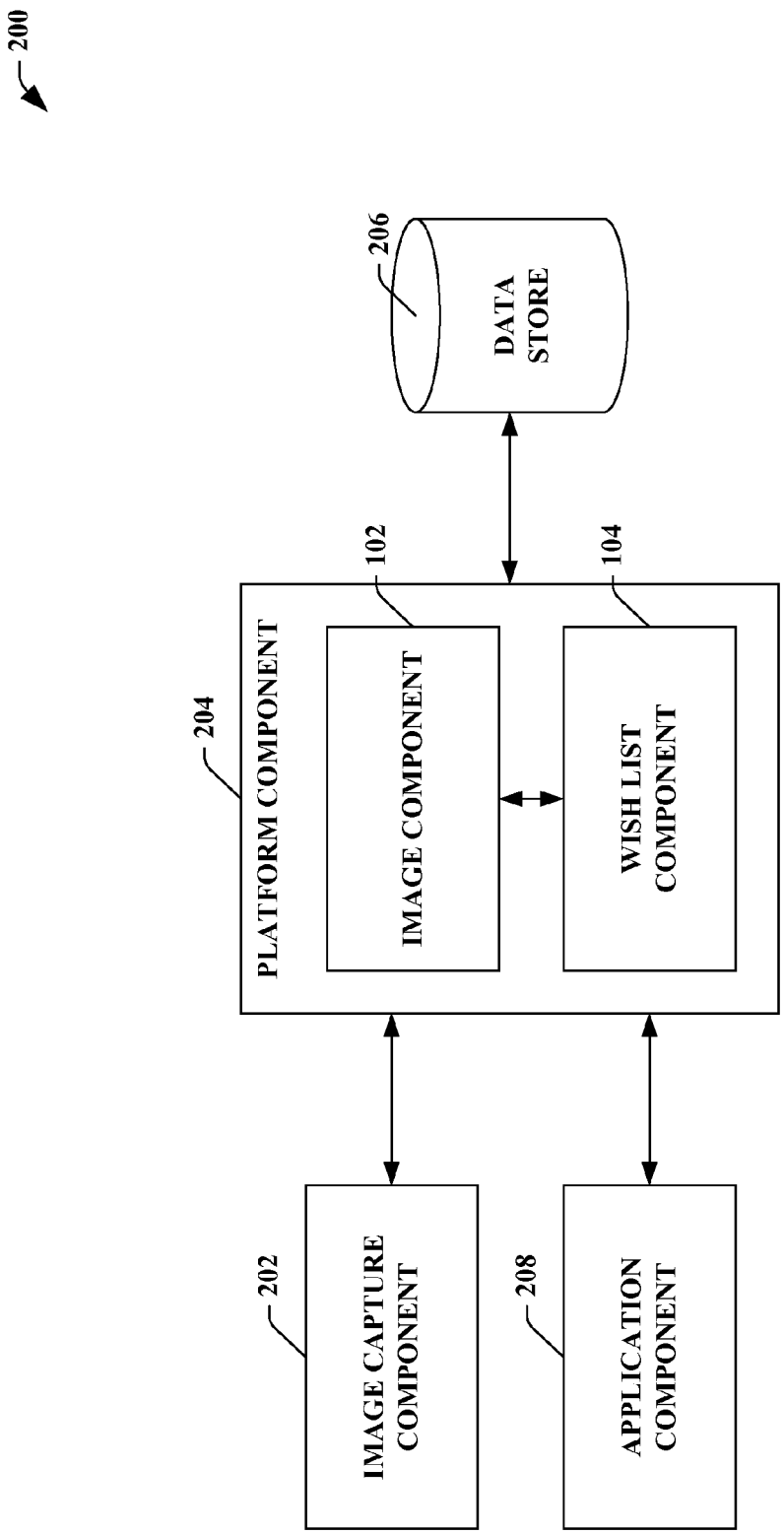
FIG. 2 illustrates a block diagram of an exemplary system that stores an image and associated wish list(s).

Referring to FIG. 2, a system 200 for receiving an image and associating the image with a wish list is shown. An image capture component 202 is provided that can capture/receive an image and transmit the image to a platform component 204. The platform component 204 comprises an image component 102 that receives the image and sends the image, or a link thereto, to a wish list component 104; the wish list component 104 can associate the image with one or more wish lists. A data store 206 is provided that can store information including the image and/or associated wish list information from the platform 204. Additionally, an application component 208 can be provided to subsequently access the wish list information and/or the image from the platform component 204. In one embodiment, the image capture component 202 can capture an image, such as in a photograph, for example, and transmit the image to the platform component 204 for insertion into the image component 102. The image component 102 can submit the image to the wish list component 104, which can insert the image in one or more wish lists. The wish list and image information can be stored in the data store 206 for subsequent access requests by the application component 208 (via the platform component 204), for example.

In one embodiment, the image capture component 202 can be a portable device, such as a digital camera, a cellular phone and/or personal digital assistant (PDA) equipped with a camera, or substantially any other camera equipped device. Additionally, the image capture component 202 can be many other digital devices, such as a tablet PC for capturing a drawing, image creation software, a web browser that can download pictures from one or more websites, etc. Moreover, the image capture component 202 can be an analog device, such as a 35 mm camera, sketch pad, and the like, coupled with a digital capture/transformation device, such as a scanner (flat-bed and/or photo, for example). The device can also be a computer and/or coupled to a computer, for example. Regardless of the device used, the image capture component 202 can have the ability to tag an item for placement into a wish list. For example, where a digital camera is used, the camera can have a setting and/or a prompt following taking a photo that allows the user to specify that the photo should be part of a wish list. The camera can be configurable in this regard, for example, to receive and store information about the desired wish list. In one embodiment, the digital camera can be communicatively coupled to the platform component 204 (e.g. by wireless Internet communication and/or cellular communication) and can directly communicate the picture and wish list information to the platform component 204. In another embodiment, the digital camera can be coupled to a computer or other device to upload images and wish list tag information to the platform component 204; the computer or other device is communicatively coupled (by the Internet whether wired or wireless, for example) to the platform component 204. In this embodiment, the configuration can be additionally or alternatively at the computer or other device end. In either embodiment, once the platform component 204 receives the image and wish list information, such can be forwarded to the image component 102 and the wish list component 104 for further processing, for example. Additionally, the information can be stored in the data store 206, as well.

In one embodiment, the application component 208 can be utilized to access the platform component 204. In this regard, the application component 208 can be communicatively coupled to the platform component 204, for example, by way of the Internet or other medium (direct connection, infrared connection, wireless connection, etc.). The application component 208 can request access to an image and/or wish list information from the platform component 204. In one embodiment, the platform component 204 can return one or more images via the image component 102 and/or wish list information, whether associated with the image or not, via the wish list component 104. The application component 208 can be utilized in this regard to modify information associated with the image and/or the wish list. For example, the application component 208 can be utilized by a user to access his/her wish list information. The information can come with one or more previously snapped photographs, for example, to which the user can associate additional information. The user can identify the object in the photograph, for example after further searching/research, and store the item information in the wish list (via the wish list component 104, for example). It is to be appreciated that other identification techniques can be employed as well, such as allowing a friend to view a wish list and identify the item (e.g. the wish list can be accessible from a social networking platform) and/or an advertiser can view the wish list (which can be open to the public or advertising companies, for example) and identify its products (and/or competing products, for example). Subsequently, additional information can be associated with the identified image by the platform component 204 and/or a component thereof, for example, and stored with the wish list information in the data store 206. The information can comprise additional characteristics regarding the item of interest and/or similar items, which can additionally be populated to the wish list and/or a second recommendation list, for example. In another embodiment, the image component 102 can identify the item itself and/or present options to the user as to possible choices of what the item might be (this can be based on similar photos from other users, additional images, colors, shapes, and the like present in the picture, for example). Once identified, the additional information can be added as described, for example.

In another embodiment, the application component 208 can be used to access the platform component 204 for information regarding personal design/fashion advice, for example. As described above and in more detail infra, the image capture component 202 can be used to take a photo of a user and/or a being or inanimate object associated therewith, for manual and/or automated personal design advice, for example. The image can be transmitted to the platform component 204 for processing and advice rendering. The application component 208 can be utilized to access the image and associated wish list information, which can comprise recommendations based on the object in the image. Moreover, though not shown, the application component 208 can be utilized by the image capture component 202 to access the platform component 204 for submitting image and wish list tagging information, for example. In still another embodiment, the image capture component 202 can also access information in the platform component 204, such as images and wish list information, for viewing and/or downloading.

Figure 3:
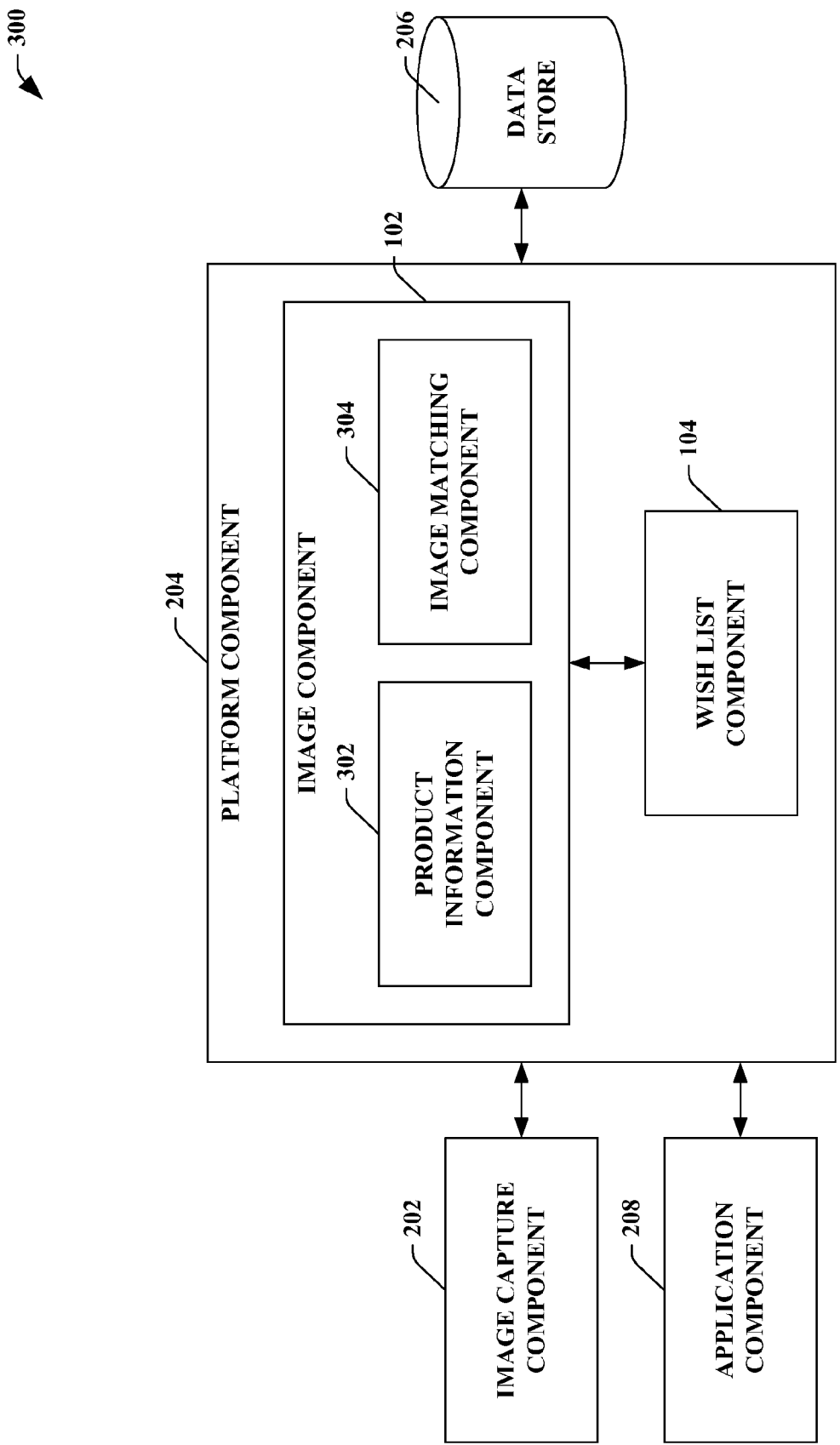
FIG. 3 illustrates a block diagram of an exemplary system that matches item(s) of an image to additional information.

Turning now to FIG. 3, a system 300 for associating information with an image or an item thereof is displayed. An image capture component 202 is provided that can obtain and provide an image to a platform component 204. The platform component can further comprise an image component 102 and a wish list component 104; the image component 102 further comprises a product information component 302 that associates product information with one or more items in an image and an image matching component 304 that matches an item in the image to one or more definite items. Additionally, a data store 206 is provided to house data related to the image, wish list, and associated information; the data store 206 can also house images of other items. An application component 208 is also provided to facilitate accessing one or more images, wish lists, and/or related information, for example.

In one embodiment, the image capture component 202 can create a digital image, such as from an analog image or via digital photograph for example, and send the image to the platform component 204 for storage in a wish list therein. The platform component 204 can receive the image as well as information associated with a wish list, such as a user and/or wish list identifier, from the image capture component 202. The platform component can submit the image to the image component 102 for analysis thereof, for example, the image can be matched with one or more images in the image matching component 304 (or stored in the data store 206) or substantially any image accessible by the image matching component 304. Additionally, other characteristics and the like can be associated with the image by the product information component 302 once the item is identified, for example. The information discovered can be input into the wish list component 104, for example, for storage therein and/or association with other products. This information can be stored in the data store 106 as well and accessible by the various components. Furthermore, the application component 208 can be utilized to subsequently access the information of the platform component 204 described in this embodiment.

In another embodiment, the image capture component 202 can transmit the image to the platform component 204 and later access the platform component 204, such as by way of the image capture component 202 and/or the application component 208, to view one or more wish lists associated with the image and/or a user thereof, for example. Upon viewing the wish list and the image in the wish list, the user can identify one or more objects in the picture manually, based on research for example. Alternatively, the image matching component 304 can attempt to automatically identify the item (or have another user, such as an administrator, identify the item) for the user to whom the item relates. Automatic matching of an image can occur in a number of ways including processes similar to fingerprint matching or substantially any process, and/or inference technique for example, that can identify an image against a database of images based in part on points of matching, and/or the like.

In one embodiment, a database of images (or substantially any image accessible by the image matching component 304) can comprise a plurality of images from one or more retailers for which some information about the images is known—the image can comprise an item that the retailer sells, for example. Additionally, images related to other users' wish lists can be searched for close or exact matches, and the information stored by the disparate user can be utilized to associate information to the image being searched, in one embodiment. For example, the image matching component 304 can additionally match the image to a plurality of likely items (whether from data store 206, a retailer database, other users' wish lists, search engine, image storage, system cache, remote image repositories, and the like for example) and allow selection of one or more of the matched items (such as by a user using the image capture component 202 and/or the application component 208) for identification and/or placement in a related wish list. It is to be appreciated that the image matching component 304 can be implemented with machine learning in this regard. For example, as more images in the platform component 204 are matched/identified, the image matching component 304 can utilize these images in subsequent image matching creating its own mechanism for identifying images it has already identified, for example.

Once an image is substantially identified (or a similar item selected, for example), whether manually or automatically, the product information component 302 can associate additional information with the item, such as price, places to purchase, color, size, feel, category, material, etc. In one embodiment, an item in an image can be identified via one or more of substantially any image matching techniques including, but not limited to, image registration techniques including comparisons via linear and/or Fourier transforms, single- and/or multi-modality image registration, as well as machine learning techniques such as pattern recognition (e.g. using a sensor, feature extractor, and classifier for matching portions of an image or item thereof), and the like. The image matching component 304 can store this information with the image and/or in the wish list component 104 to a wish list associated with the image. The wish list component 104, as will be described in greater detail infra, can locate the item and/or similar items to facilitate an operable wish list having one or more products and appropriate store and pricing information, for example.

Moreover, the image matching component 304 can identify more than one item in an image. For example, a user can see an outfit they like on another person. The outfit can be seen in person and the user can photograph the outfit using an image capture component 202; additionally, the outfit can be seen in a magazine and digitized (e.g. scanned/photographed) using the image capture component 202. Furthermore, the image can be seen in a digital image, such as on a website, and the user can take a screenshot, photograph, or download the image, for example. In either case, the image can be uploaded to the platform component 204 for storage in a wish list related to the user, for example. The image matching component 304 can discover one or more items in the picture. For example, using manual or automatic identification, the image matching component 304, or a design consultant/administrator working with the image matching component 304, can evaluate the image. For example, the image can comprise a person wearing a shirt and jeans that the user desires. In this regard, the image matching component 304 can identify at least the shirt and jeans in the picture. It is to be appreciated that other items can be identified as well, such as items in the background, shoes, jewelry, other accessories, etc. The image matching component 304, and/or a professional operating such, can attempt to identify the separate items using techniques described above, locate additional information using the product information component 302, and store available information in the wish list component 104. In one example, the user can login to the platform component 204 using the application component 208, for example, and be presented with a plurality of options that match different items in the picture. The user can select which items to include in their wish list, for example, and the wish list component 104 can store such as well as find similar items.

Figure 4:
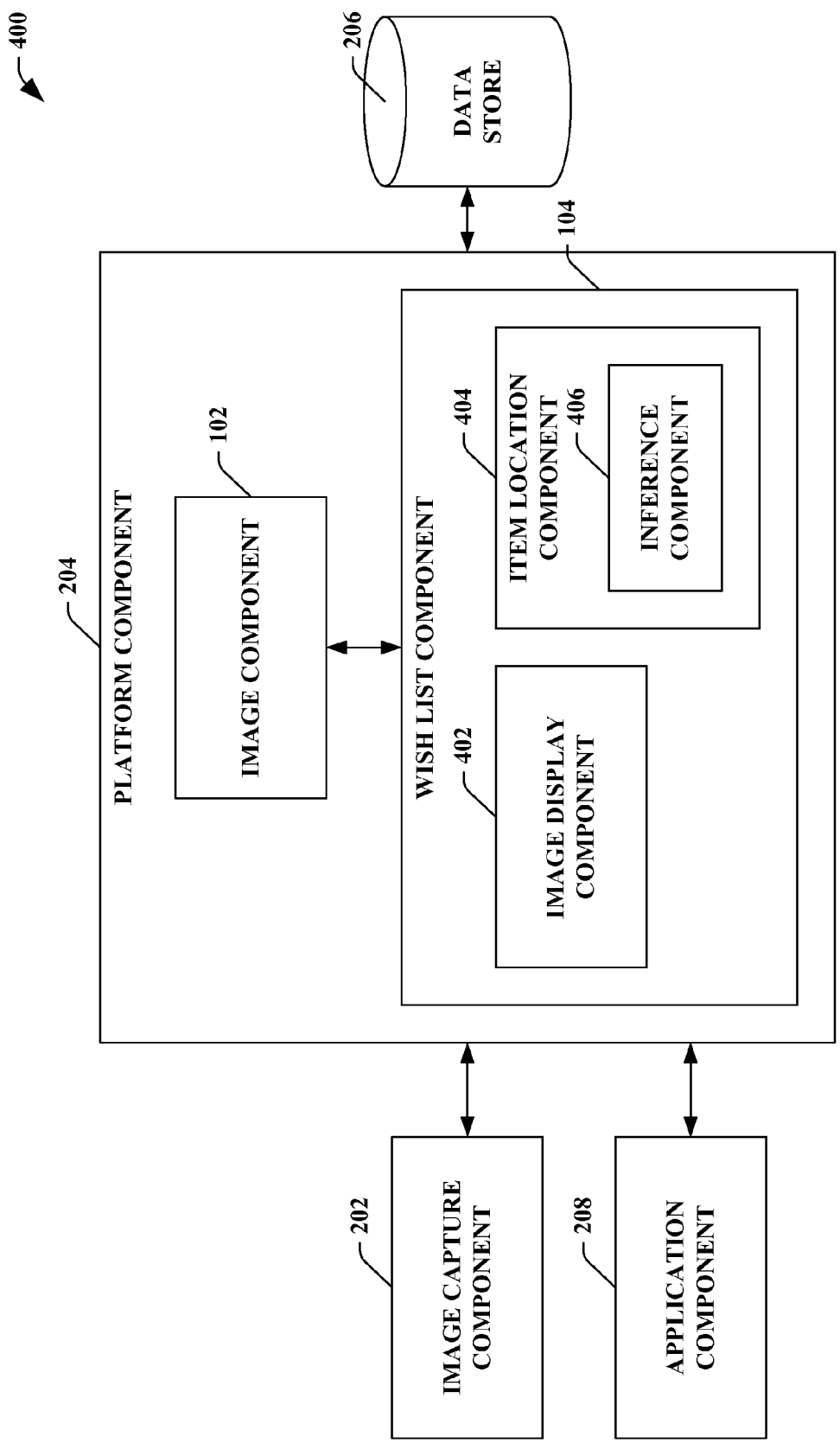
FIG. 4 illustrates a block diagram of an exemplary system that locates similar items to those in an image.

Referring now to FIG. 4, a system 400 that facilitates associating an image with a wish list is shown. An image capture component 202 is provided that creates, captures, or otherwise obtains an image for association with a wish list. A platform component 204 is provided comprising an image component 102 that can receive the image and leverage a provided wish list component 104 to associate information with the image. The image component 102 can also associate other information with the image. The wish list component 104 can link the image to one or more wish lists that can relate to the image capture component 202 and/or a user thereof. The wish list component 104 can comprise an image display component 402 that can display images and associated information of a wish list and an item location component 404 that can locate an item in the image in similar contexts and/or locate similar items to that in the image; the item location component 404 can comprise an inference component 406 that utilizes artificial intelligence or other inference techniques to provide such location and identification. Information regarding the image and the wish list can be stored in a data store 206, and an application component 208 can subsequently access the stored information.

In one embodiment, the image capture component 202 can capture one or more images, as described supra, and transmit the image(s) to the platform component 204 for association with a wish list if desired. The wish list component 104 can store the image or a link thereto along with other information, for example, in a wish list related to a user and/or the image. The application component 208 can allow a user related to the wish list and the image to access the image and/or one or more items thereof via the image display component 402, for example. The wish list component 104 can also create separate wish list items for multiple items of a single image if they exist and leverage the image display component 402 to display the different items of the image. For example, the image display component 402 can highlight a certain item in the original photo and/or provide a photo from a manufacture that matches the given item. Additionally, the item location component 404 can search for items similar to those present in the image using the inference component 406 to determine whether located items are similar enough to be placed in the wish list, for example.

In one embodiment, for example, one or more items in the image can be identified, such as by the image component 102 as described supra, and additional information can be located and provided regarding the one or more items. The item location component 404 can locate the one or more items, for example, among many manufacturers and present these to the user using the image display component 402, for example. Furthermore, the item location component 404 can locate one or more similar items based at least in part on additional information received regarding the item. The inference component 406 can be utilized to facilitate this aspect by using one or more inference techniques, such as support vector machines, neural networks, expert systems, Bayesian belief networks, fuzzy logic, data fusion engines, classifiers, and/or the like to determine if the similar items should be placed in the wish list. In one embodiment, the inference component 406 can evaluate similar wish lists comprising the item and/or manufacturer recommendations for similar items and/or accessories. For example, the item in the image can be a new gadget or toy; once identified, information about the gadget/toy can be input into a wish list relating to a user to whom the image relates. The item location component 404 can then find the gadget/toy at one or more retailers and input information regarding the retailer and price, for example. Moreover, the item location component 404 can find similar or related gadgets/toys or certain accessories by utilizing the inference component 406 to determine a relevance of the similar items based on other wish lists, characteristics of the entity to which the wish list relates, retail trends (e.g. geographically or otherwise), and the like for example, and place such in the wish list as well. For example, the gadget/toy can have been replaced by a new version; the item location component 404 can locate the new version upon placing of the item in the wish list.

Moreover, the item location component 404 can locate accessories as well; for example, the item in the image can be a device such as an MP3 player. Perhaps the item is a model from a few years back. The item location component 404 can locate the item, which can maybe only be available only by refurbished outlets and/or auction houses in this example, and place it in the wish list once identified. The item location component 404 can additionally locate the current version of the MP3 player, which can be matched using the inference component 406 for example, and place it additionally or alternatively in the wish list. Moreover, the item location component 404 can locate accessories, such as portable speakers, protective covers, charging cables, docking stations, and the like, placing one or more (or none) of them in the wish list as well, for example. As described, some or substantially all of the foregoing information can be stored in the data store 206.

Figure 5:
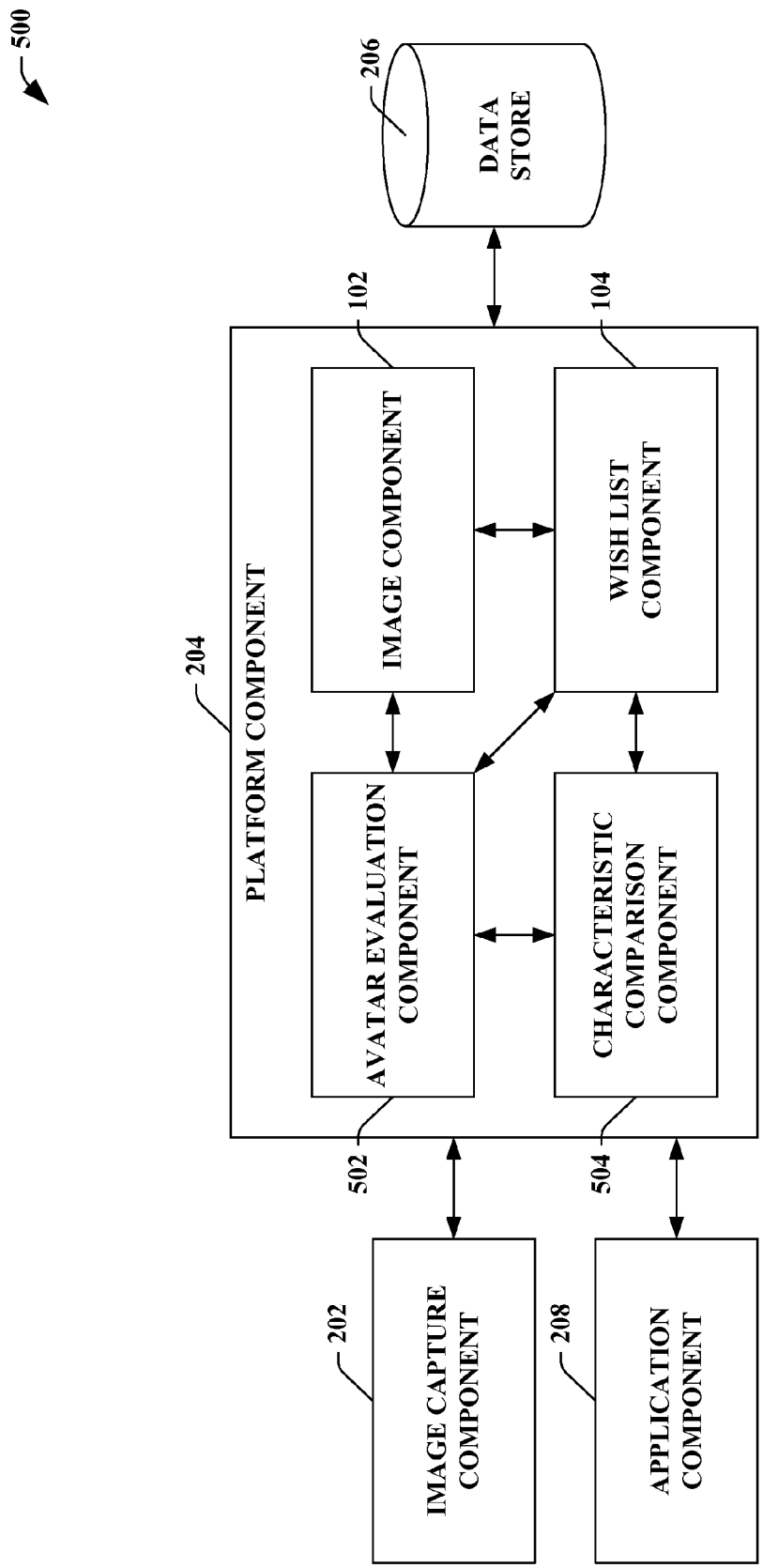
FIG. 5 illustrates a block diagram of an exemplary system that provides fashion/design advice to a wish list based on an image.

Now referring to FIG. 5, a system 500 is displayed that facilitates populating a wish list based on one or more observations made regarding an image. An image capture component 202 is provided that obtains and/or digitizes an otherwise analog image and transmits the image to a platform component 204. The platform component comprises an image component 102 that can receive the image for processing thereof, a wish list component 104 that can associate the image or other information related thereto to one or more wish lists, an avatar evaluation component 502 that can evaluate an image, determining characteristics thereof, for choosing items to store in a wish list, and a characteristic comparison component 504 that can utilize the characteristics to compare to other users (and/or their wish lists) to locate items for input into a wish list related to the user. A data store 206 is also provided to store appropriate information as well as an application component 208 to facilitate retrieving the information.

In one embodiment, the image capture component 202 can be used to take a photograph of a person, such as a user (or a friend in a gift context, for instance), for obtaining recommendations on clothing items for the user, for example. The image capture component 202 can submit the photograph, as well as the desire to receive fashion advice, for example, to the platform component 204 for evaluation thereof. The image capture component 202 can receive the picture and forward it to the avatar evaluation component 502 based on the desire for fashion advice, for example. The avatar evaluation component 502 can analyze aspects of the image to make decisions about one or more objects in the image. For example, the avatar evaluation component 502 can analyze the person in the picture to evaluate skin tone, shape of the person, size, facial features, clothing, hairstyle, body type, and the like. Using this information, the avatar evaluation component 502, or another component of the platform component 204, can select clothing items to recommend to the user and/or place such in their wish list by leveraging the wish list component 104, for example. Additionally, the characteristics evaluated about the person in the image can be sent to the characteristic comparison component 504 for comparison with other user characteristics. Using this information, the characteristic comparison component 504 can select items recommended to users having similar characteristics and/or similar items selected by users having similar characteristics for insertion into their wish list. It is to be appreciated that the avatar evaluation component 502 can automatically evaluate the image and/or a professional can operate the component to observe the image and generate one or more fashion recommendations, such as products to be placed in a wish list related to the user. As described previously, substantially any image matching techniques can be used to facilitate this aspect, such as image registration techniques including comparisons via fast Fourier transforms, single- and/or multi-modality image registration, pattern recognition, and the like.

In another embodiment, the image capture component 202 can be used to photograph an inanimate object, such as a room and/or a piece of furniture, for example. The image capture component 202 can forward the photo to the platform component 204, for example, and the photo can be given to the image component 102 along with a request for personal design advice. The request can originate from the image capture component 202 and/or the application component 208 can be utilized to access the picture on the platform component 204 (and/or image component 102) at which time a request can be transmitted for personal design advice, for example. The image component 102 can submit the picture, or a portion thereof, to the avatar evaluation component 502 for analysis thereof For example, the avatar evaluation component 502 can discern characteristics from the picture such as room shape, size, layout, angles, colors, furniture-related aspects, and the like. Using this information, the avatar evaluation component 502 can select products for insertion into a wish list related to a user of the room photographed, for example. Additionally, the avatar evaluation component 502 can select products, for example, according to a generic wish list of a user. In one embodiment, the generic wish list can comprise desired categories of items, such as wallpaper and borders. Thus, the avatar evaluation component 502 can select one or more wallpapers and/or borders that go with the room for insertion into a wish list by leveraging the wish list component 104, for example. Also, as described supra, the characteristic evaluation component 504 can be utilized to select recommendations based in part on what other users with similar rooms selected and/or were recommended, for example. It is to be appreciated that the avatar evaluation component 504 can analyze the picture and select options automatically and/or a professional can utilize the component to view pictures and provide selections of items to the user's wish list, for example.

The application component 208 can be used to view the items in the wish list component 104 as well as clarify information about the picture(s). Additionally, the application component 208 can be presented with different options from the wish list component 104 regarding items selected by the avatar evaluation component 502, the characteristic comparison component 504, and/or a professional operating the components. Upon selection and/or rating of one or more options related to the image (such as wallpaper in the room image example), the platform component 204 (and/or a component thereof) can select additional options (borders, furniture, fixtures, etc. in the room example) based on matching schemes, other users' selections, manufacturer or other professional recommendation, and the like for example.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent, for instance by inferring actions based on contextual information. By way of example and not limitation, such mechanism can be employed with respect to generation of materialized views and the like.

Figure 6:
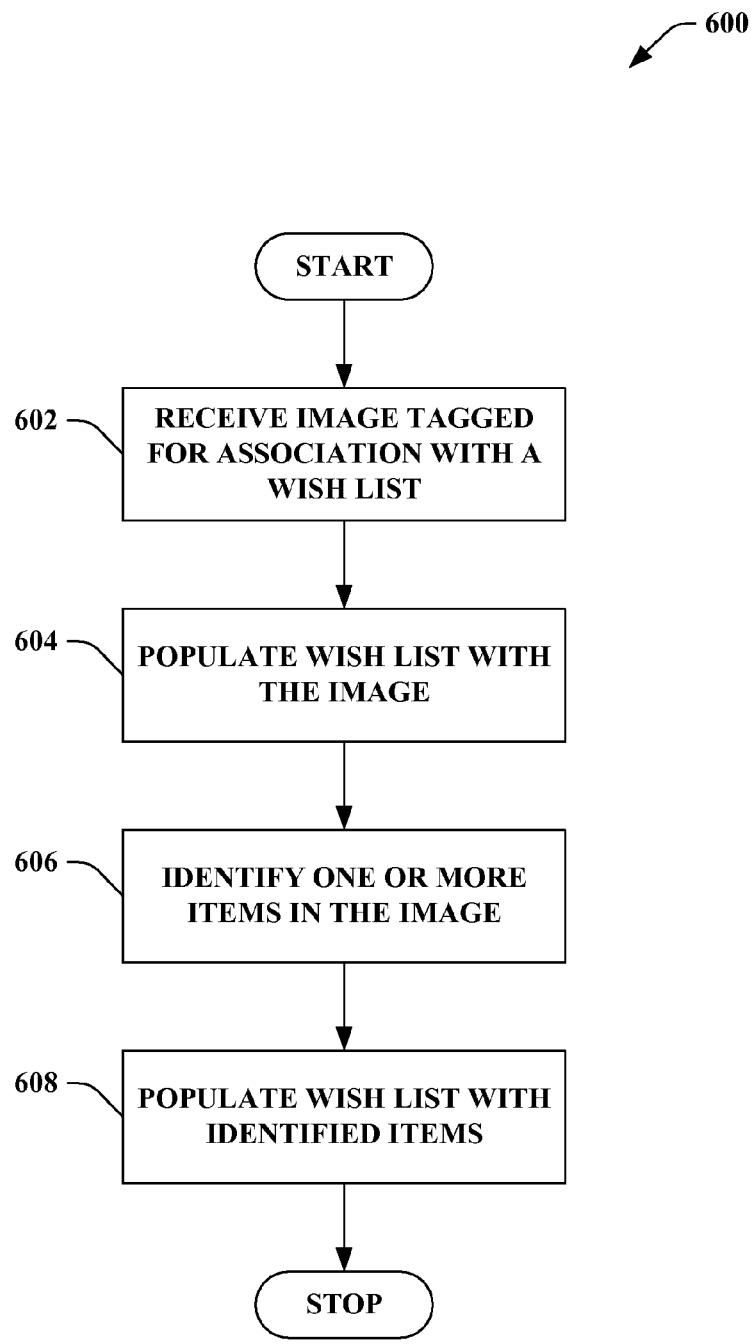
FIG. 6 illustrates an exemplary flow chart for populating a wish list with an item in an image and information related thereto.
Figure 7:
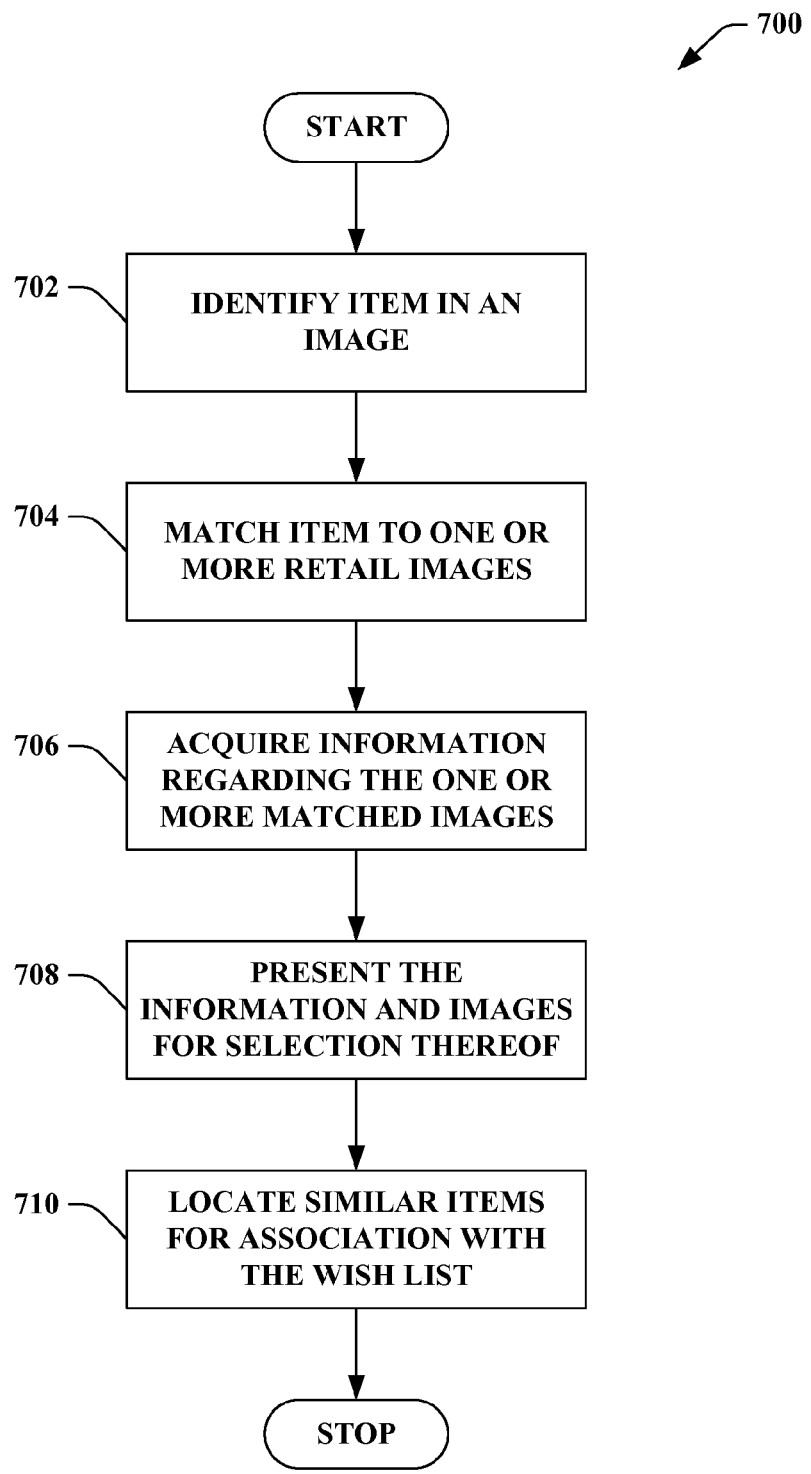
FIG. 7 illustrates an exemplary flow chart for associating retail information with one or more items in an image.
Figure 8:
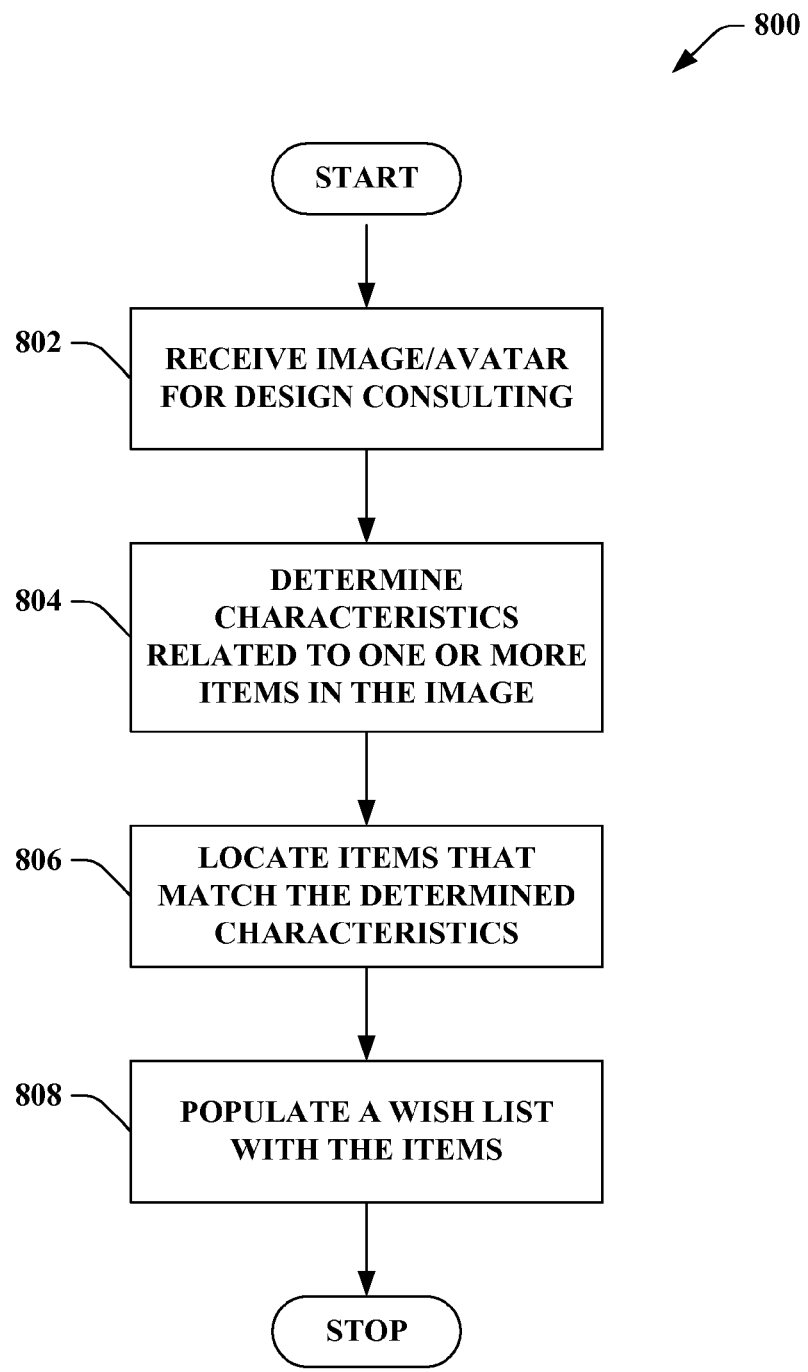
FIG. 8 illustrates an exemplary flow chart for providing design/fashion advice based on an image.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 6 shows a methodology 600 for associating an image with a wish list. At 602, an image tagged for association with a wish list is received. The image can comprise one or more items, for example, and can originate from a plurality of disparate sources. For example, the image can be captured via digital camera, cellular phone equipped with a camera, scanner digitizing an analog photograph, and the like. The source can additionally offer the option to tag an image for association with the wish list and submit the image to a wish list. Additionally, this can be done on another device, etc. At 604, the wish list can be populated with the image. In one embodiment, the wish list can relate to items a user wishes to own; the image can display one or more such items for later association with actual items (or similar items) and locations/prices for such, for example.

At 606, one or more items in the image are identified for association of additional information therewith, for example. In one embodiment, the item can be identified manually, such as by a user to whom the wish list related upon accessing the wish list or by using an automatic matching process against a plurality of images, for example. It is to be appreciated that the user can identify the item upon accessing, by doing some research, and/or by being presented with possible options as to what the item is. At 608, the wish list can be populated with the identified item or items. Thus, the user's wish list can comprise the actual item. There can also be additional information such as a purchase location and/or price, category, description, size, similar products, identification numbers, etc.

FIG. 7 illustrates a methodology 700 that facilitates matching an item of an image with one or more retail images. The retail images can be comprised in a database, a plurality of databases, and/or substantially any accessible source or sources. At 702, an item in an image is identified; for example, this can be one or more retail items such as a gadget, toy, article of clothing, furniture, car, and the like. It is to be appreciated that an image can comprise one or more identifiable items. At 704, the item is matched to one or more retail images. As mentioned, the images can be those accessible via one or more sources and can relate to one or more manufactures of the retail items in the image. Matching the retail item to the image can provide a context and additional information to the item in the image desired for a wish list, for example. It is to be appreciated that an item in an image can match to one or more retail images in one embodiment.

At 706, information regarding the one or more matched retail images is retrieved. The information can comprise identifying information to allow retrieval of retailers and pricing, for example; additionally, the information can comprise other characteristics related to the retail images. For example, the image can be of a piece of art desired by an originating source of the image (such as a user using a camera, for example). The image can be matched to an original and one or more duplicates, for example and information regarding both can be displayed. In this regard, the wish list can comprise both items and allow selection of either one or both based on relevant characteristics (such as price difference, size, authenticity, etc.). At 708, gathered information and images can be presented for selection thereof As described, one or more options can be available for a given identified item. This can occur where multiple versions are available and/or where the matching cannot decide between some matching items (e.g. not enough information provided in the image). Presenting the matching information and items can facilitate selecting one or more of the items, expressing a desire for one over the other. Using this information, the wish list can rid of the other items in one embodiment. Optionally, at 710, similar items can be associated with the wish list, for example, based in part on the selection made. For example, where the selection made is a television, television stands, cables, video devices, audio devices, speakers, and the like can be inserted into the wish list.

FIG. 8 shows a methodology 800 for receiving an image and/or avatar and providing design tailored entries to a wish list. At 802, an image/avatar is received for design consulting. The image or avatar can be of a person, for example, desiring fashion advice (e.g. automatic clothing selection). Additionally, the image can relate to a room, piece of furniture, and/or substantially any object for which fashion/design advice is desired, for example. At 804, characteristics related to the image or avatar can be determined. These can be substantially any aspect related to the image/avatar. For example, where the image is of a user, skin tones, body type, body shape, size, facial features, hair color, hair style, clothing style, and/or the like, can determined. Where the image is an inanimate object, such as a room, piece of furniture, etc., shades, colors, hues, angles, objects (in a room), borders, wood-work, flooring, and the like can be evaluated.

Using these features, items can be chosen that match the object in the picture at 806. For example, clothing in the user example can be selected using the characteristics, such as jeans, shirts, shoes, etc. Additionally, hair styles, make-up, accessories, and the like can be chosen. In the room example, wallpapers, borders, trim, additional furniture, layout management, flooring, and other items can be chosen. At 808, the items can be populated in the wish list; for example, the wish list can relate to the entity that submitted the image/avatar. It is to be appreciated that the recommended items can be selected systematically, based on determined characteristics and using inference regarding design/fashion, for example (and/or items chosen by other users with similar characteristics). Moreover, fashion/design professionals can view the images and select items to be put in the wish list, for example.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
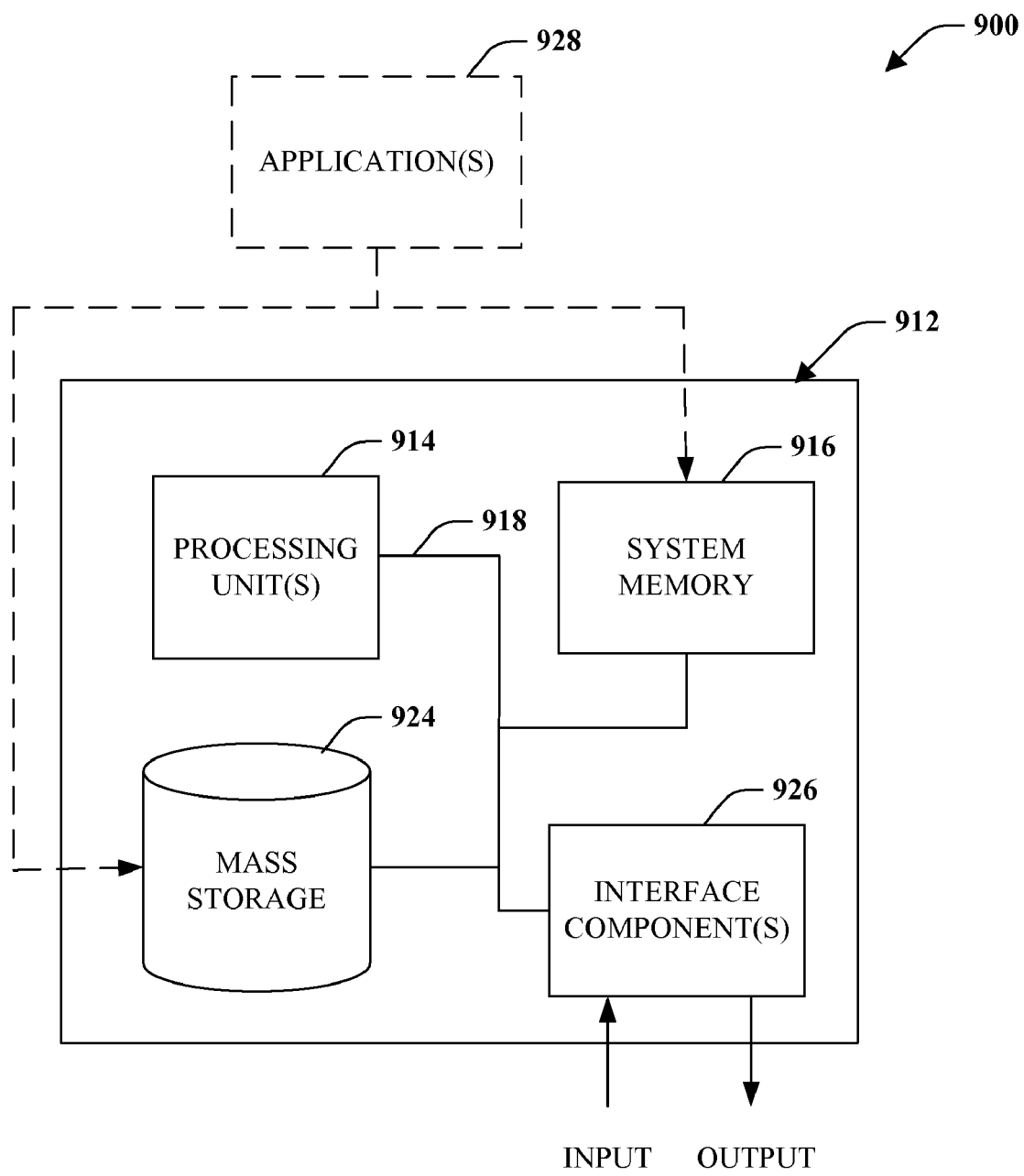
FIG. 9 is a schematic block diagram illustrating a suitable operating environment.
Figure 10:
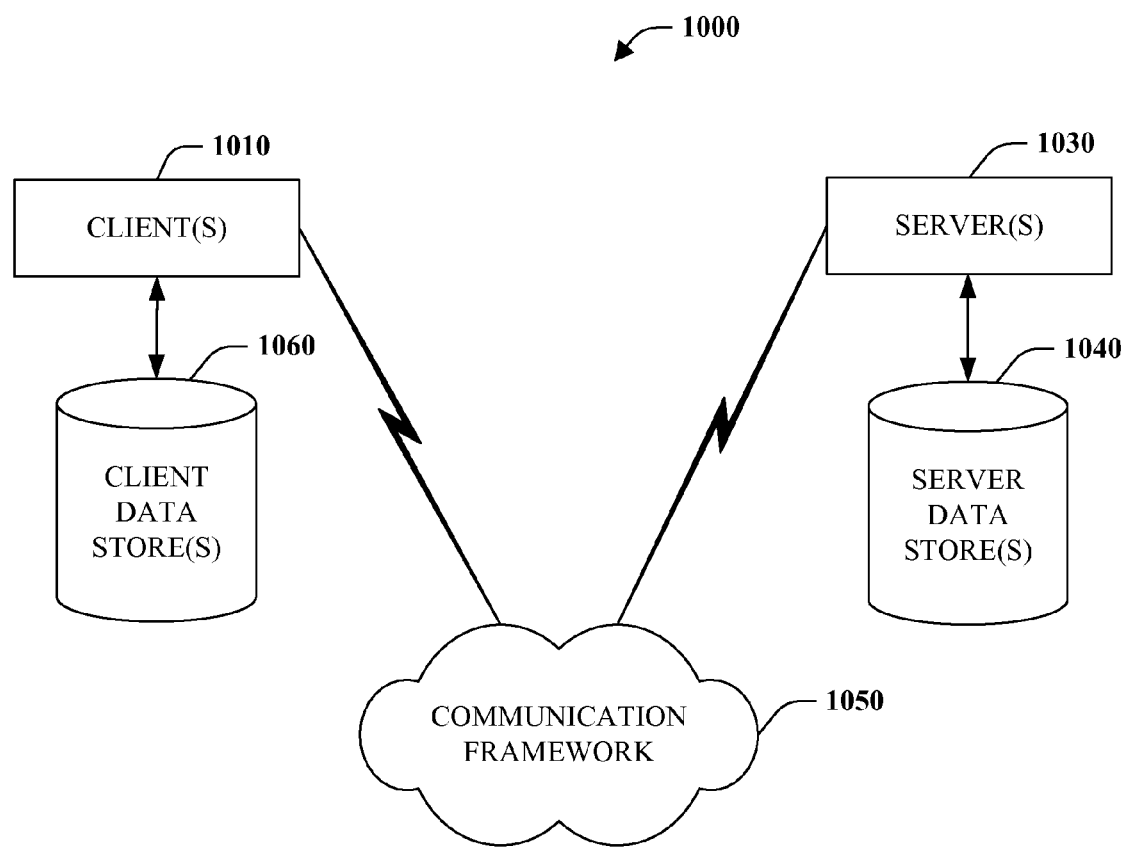
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 9, an exemplary environment 900 for implementing various aspects disclosed herein includes a computer 912 (e.g., desktop, laptop, server, hand held, programmable consumer or industrial electronics . . . ). The computer 912 includes a processing unit 914, a system memory 916 and a system bus 918. The system bus 918 couples system components including, but not limited to, the system memory 916 to the processing unit 914. The processing unit 914 can be any of various available microprocessors. It is to be appreciated that dual microprocessors, multi-core and other multiprocessor architectures can be employed as the processing unit 914.

The system memory 916 includes volatile and nonvolatile memory. The basic input/output system (BIOS), containing the basic routines to transfer information between elements within the computer 912, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 912 also includes removable/non-removable, volatile/non-volatile computer storage media. FIG. 9 illustrates, for example, mass storage 924. Mass storage 924 includes, but is not limited to, devices like a magnetic or optical disk drive, floppy disk drive, flash memory or memory stick. In addition, mass storage 924 can include storage media separately or in combination with other storage media.

FIG. 9 provides software application(s) 928 that act as an intermediary between users and/or other computers and the basic computer resources described in suitable operating environment 900. Such software application(s) 928 include one or both of system and application software. System software can include an operating system, which can be stored on mass storage 924, that acts to control and allocate resources of the computer system 912. Application software takes advantage of the management of resources by system software through program modules and data stored on either or both of system memory 916 and mass storage 924.

The computer 912 also includes one or more interface components 926 that are communicatively coupled to the bus 918 and facilitate interaction with the computer 912. By way of example, the interface component 926 can be a port (e.g., serial, parallel, PCMCIA, USB, FireWire . . . ) or an interface card (e.g., sound, video, network . . . ) or the like. The interface component 926 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 912 to output device(s) via interface component 926. Output devices can include displays (e.g., CRT, LCD, plasma . . . ), speakers, printers and other computers, among other things.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the aspects of the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. Here, the client(s) 1010 can correspond to program application components and the server(s) 1030 can provide the functionality of the interface and optionally the storage system, as previously described. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

By way of example, one or more clients 1010 can be an image capture device and/or an application, for example. The clients can capture images and transmit the images to the one or more servers 1030, via communication framework 1050, tagging the images for insertion into a wish list. The one or more servers 1030 can access the wish list from one or more server data stores 1040 and associate the image therewith, such as by a link and/or a copy of the image. A request can be made via the communication framework 1050 for the wish list with associated images from client(s) 1010. The server(s) 1030 can match one or more items in the image with a retail item and can return the information to the client(s) 1010 via the communication framework 1050. In one example, the client(s) 1010 can store the data in one or more local client data store(s) 1060, for example.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A system for associating images with wish lists, the system comprising:
    a computer processor;
    an image component that receives an image for insertion into a wish list, wherein the image component automatically identifies one or more items in the image and associates identification information with the one or more items;

a wish list component that inputs the identification information into one or more wish lists of a user from which the image originates;

an avatar evaluation component that analyzes the image to determine one or more characteristics; and a characteristic comparison component that determines additional items for input into the one or more wish lists of the user by comparing the one or more characteristics determined by the avatar evaluation component to one or more wish lists belonging to other users.

2. The system of claim 1, wherein the image is a photograph received from a camera.

3. The system of claim 2, wherein the camera is on a cellular phone, and wherein the cellular phone transmits the photograph to the image component.

4. The system of claim 1, further comprising an image matching component that compares the image to one or more additional images to facilitate the automatic identification of the one or more items.

5. The system of claim 4, wherein the automatic identification of the one or more items is performed using image registration techniques or pattern matching.

6. The system of claim 4, further comprising a product information component that locates additional information about the one or more items identified by the image component.

7. The system of claim 1, further comprising an item location component that finds one or more establishments that sell at least one of the one or more items identified in the image.

8. The system of claim 7, wherein the item location component finds at least one additional item related to the one or more items identified in the image.

9. A method for associating one or more images with a wish list, comprising:

receiving an image from an image capture device;

indentifying, by an image component, one or more items in the image and associating identification information with the one or more items;

inputting, by a wish list component, the identification information into one or more wish lists of a user from which the image originates;

analyzing, by an avatar evaluation component, the image to determine one or more characteristic; and determining, by a characteristic comparison component, additional items for input into the one or more wish lists of the user by comparing the one or more characteristics determined by the avatar evaluation component to one or more wish lists belonging to other users;

wherein the steps above are performed using a computer processor.

10. The method of claim 9, further comprising matching the one or more items to one or more images of retail items.

11. The method of claim 10, further comprising locating additional information about the one or more retail items.

12. The method of claim 11, wherein the additional information comprises a retail store that carries the one or more retail items and a corresponding price of the one or more retail items.

13. The method of claim 10, wherein a database is used to facilitate the matching of the one or more items to the one or more images of retail items.

14. The method of claim 9, wherein the image capture device allows the user to tag the image for insertion into the one or more wish lists of the user.

15. A computer-readable medium storing instructions for associating one or more images with a wish list, the instructions when executed by a computer processor cause the computer to perform the following steps:

receive an image from an image capture device;

identify, by an image component, one or more items in the image and associate identification information with the one or more items;

input, by a wish list component, the identification information into one or more wish lists of a user from which the image originates;

analyze, by an avatar evaluation component, the image to determine one or more characteristics; and determine, by a characteristic comparison component, additional items for input into the one or more wish lists of the user by comparing the one or more characteristics determined by the avatar evaluation component to one or more wish lists belonging to other users.

* * * * *